US012802971B2

(12) United States Patent
Wang et al.

(10) Patent No.: US 12,802,971 B2
(45) Date of Patent: Nov. 17, 2026

(54) POSITIVE ELECTRODE MATERIAL AND PREPARATION METHOD THEREFOR

(71) Applicant: Beijing Easpring Material Technology Co., Ltd., Beijing (CN)

(72) Inventors: Jingpeng Wang, Beijing (CN); Juntao Hu, Beijing (CN); Yuqiang Jin, Beijing (CN); Chuangjiang Ni, Beijing (CN); Xuequan Zhang, Beijing (CN); Yafei Liu, Beijing (CN); Yanbin Chen, Beijing (CN)

(73) Assignee: Beijing Easpring Material Technology Co., Ltd., Beijing (CN)

( * ) Notice: Subject to any disclaimer, the term of this patent is extended or adjusted under 35 U.S.C. 154(b) by 543 days.

(21) Appl. No.: 18/286,305

(22) PCT Filed: Jun. 28, 2022

(86) PCT No.: PCT/CN2022/101702
§ 371 (c)(1),
(2) Date: Oct. 10, 2023

(87) PCT Pub. No.: WO2023/093034
PCT Pub. Date: Jun. 1, 2023

(65) Prior Publication Data
US 2024/0204173 A1 Jun. 20, 2024

(51) Int. Cl.
*H01M 4/36* (2006.01)
*C01G 53/50* (2025.01)
(Continued)

(52) U.S. Cl.
CPC ............ *H01M 4/366* (2013.01); *C01G 53/50* (2013.01); *C01G 53/504* (2025.01);
(Continued)

(58) Field of Classification Search
CPC ...... H01M 4/366; H01M 4/505; H01M 4/525; C01P 2004/84; C01P 2006/16
See application file for complete search history.

(56) References Cited

U.S. PATENT DOCUMENTS

2019/0372110 A1 12/2019 Nam et al.
2020/0083530 A1 * 3/2020 Yun ........................ C01G 53/50

FOREIGN PATENT DOCUMENTS

CN 108269970 7/2018
CN 110050366 7/2019
(Continued)

OTHER PUBLICATIONS

English translation of CN Publication 114447321, May 2022.*
(Continued)

*Primary Examiner* — Brittany L Raymond
(74) *Attorney, Agent, or Firm* — Warner Norcross + Judd LLP

(57) ABSTRACT

The present disclosure relates to a positive electrode material and the preparation method therefor. The positive electrode material in accordance with the present disclosure is in a form of secondary particles having a core and a shell, wherein the core has a porosity greater than that of the shell. By forming larger particle voids in the cores of secondary particles, the present invention may reduce the stress concentration due to the volume deformation during the lithium ion intercalation/deintercalation, and improve the stability, rate performance, safety and cycle life of the material, which makes the material particularly suitable for lithium-ion batteries of high energy density.

8 Claims, 2 Drawing Sheets

(51) Int. Cl.

| | |
|---|---|
| ***C01G 53/504*** | (2025.01) |
| ***C01G 53/506*** | (2025.01) |
| ***H01M 4/505*** | (2010.01) |
| ***H01M 4/525*** | (2010.01) |

(52) U.S. Cl.

CPC .......... *C01G 53/506* (2025.01); *H01M 4/505* (2013.01); *H01M 4/525* (2013.01); *C01P 2002/52* (2013.01); *C01P 2004/03* (2013.01); *C01P 2004/84* (2013.01); *C01P 2006/16* (2013.01); *C01P 2006/40* (2013.01)

(56) References Cited

FOREIGN PATENT DOCUMENTS

| | | | | |
|---|---|---|---|---|
| CN | 110073527 | | | 7/2019 |
| CN | 110422889 | | * | 11/2019 |
| CN | 111732132 | | | 10/2020 |
| CN | 112018335 | A | | 12/2020 |
| CN | 112624208 | A | | 4/2021 |
| CN | 113437264 | A | | 9/2021 |
| CN | 114447321 | | * | 5/2022 |
| CN | 114530595 | A | | 5/2022 |
| KR | 20160129764 | A | | 11/2016 |
| KR | 10-2017-0063419 | | | 6/2017 |
| KR | 10-2018-0010122 | | | 1/2018 |
| KR | 10-2018-0063859 | | | 6/2018 |
| KR | 10-2020-0145747 | | | 12/2020 |
| KR | 10-2022-0057686 | | | 5/2022 |
| WO | 2022/085216 | A1 | | 6/2022 |
| WO | 2022/124801 | A1 | | 6/2022 |

OTHER PUBLICATIONS

English translation of CN Publication 110422889, Nov. 2019.*

International Search Report, English translation, for International Application No. PCT/CN2022/101702 mailed Dec. 16, 2022.

* cited by examiner

POSITIVE ELECTRODE MATERIAL AND PREPARATION METHOD THEREFOR

TECHNICAL FIELD

The present disclosure relates to lithium-ion batteries, in particular to a positive electrode material in a form of secondary particles having a core and a shell, and a preparation method therefor.

BACKGROUND

Associated with the rapid development of electric vehicles, the requirements on their range, service life and safety have become increasingly strict. Accordingly, batteries, as one key component in electric vehicles, also face enormous challenges. The performances and safety of batteries for electric vehicles are closely related to the positive electrode materials, which attract focused researches.

Ternary materials, such as LiNixCoyMn1-x-yO2, are one of the widely used positive electrode materials. With the increasing demand for energy density of batteries, the level of nickel in the ternary materials is continuously increased.

Positive electrode materials with high level of nickel may face problems such as fast falling of capacity and poor safety. The main reasons may include the follows. (1) During the delithiation in the positive electrode materials with high level of nickel, various phase transitions occur, which may lead to internal stress and strain in the particles, resulting in particle fracture, increased decay sites in the materials, structural collapse, and the like. (2) Due to the uneven distribution of lithium ions and Li/Ni disordering in the positive electrode materials, the channels for transporting lithium ions are adversely affected, so do the cycling life and safety of the materials. (3) In charging of the positive electrode materials with high level of nickel, Ni4+ on the surface may oxidize the electrolyte and produce gases, which has a significant impact on battery safety.

Various methods have been proposed in the prior art to improve the internal crystalline structure and interface stability of the positive electrode materials with high level of nickel, thereby to improve the rate performance, cycling performance and safety performance of the same. They may include coating, doping, particle size controlling and the like.

Chinese patent CN108269970B relates to a gradient doped positive electrode active material which has good interface stability, as well as a balance between high capacity and prolonged cycling performance of the material. Chinese patent CN110422889B relates to a gradient doped positive electrode active material which has advantages such as high discharge capacity, good cycling performance, and the like.

Improvements on electrical performances have been achieved in the prior art by modifying the composition of the positive electrode materials. However, there are still demands for alternative modifications of positive electrode materials, so as to further improve their performances.

SUMMARY OF THE INVENTION

To meet the above demands, provided in the present disclosure are a positive electrode material in a form of secondary particles having a core and a shell, wherein the positive electrode material is configured so that the core has a porosity greater than that of the shell, and a preparation method therefor. Such structure at least ensures that the voids between the primary particles in the core are greater than those between the primary particles in the shell. The inventive structure can effectively improve the battery performances and safety of the positive electrode material, which makes it particularly suitable for lithium-ion batteries of high energy density. Moreover, the method for preparing the positive electrode material is simple.

In one aspect, provided in the present disclosure is a positive electrode material for lithium-ion batteries, which is in a form of secondary particles having a core and a shell, wherein the core has a porosity greater than that of the shell.

In another aspect, provided in the present disclosure is a method for preparing a positive electrode material for lithium-ion batteries, wherein the positive electrode material is in a form of secondary particles having a core and a shell, and the method is characterized by comprising the steps of:

(1) subjecting a solution of soluble salts containing Ni, Co and M and a dispersion containing D to the first co-precipitation, to form the core of the secondary particles;

(2) subjecting a solution of soluble salts containing Ni, Co and M and a dispersion containing G to a second co-precipitation in the presence of the core in step (1), to form the shell on the core, to obtain the secondary particles having the core and the shell;

wherein the first co-precipitation is operated at a pH lower than that for the second co-precipitation, and a temperature lower than that for the second co-precipitation, and wherein the core has a porosity greater than that of the shell; and (3) converting the secondary particles obtained in step (2) into the positive electrode material by:

contacting the secondary particles obtained in step (2) with a lithium source material at 300-900° ° C. to obtain the positive electrode material, wherein the lithium source material is one or more of $Li_2O$, LiOH, $LiOH·H_2O$, LiNO3 and $Li_2CO_3$, wherein M is one or two of Mn and Al, D is one or more of Mo, Ti, Y, W, Ta, Nb, Cr, Sm, Sb, V, La, Ca, Hf and Zr, and G is one or more of Mo, Ta, Zn, Ti, Y, Zr, W, Nb, Cr, Sm, Al, V, La, Ca, Sb, Hf, Mg and B.

Compared with the prior art, the present invention may have the following advantageous effects.

(1) The porosity of the positive electrode material means that the material has a porous structure, which may facilitate the transportation of lithium ions and thereby enhance battery performances, such as rate performance.

(2) The core in the positive electrode material has a porosity greater than that of the shell, indicating that there is difference in voids between the primary particles in the core and those in the shell. It may reduce the possibility of cracks caused by stress and strain in the material, and thereby achieve the goal of stabilizing the material structure.

(3) The core in the positive electrode material has a porosity greater than that of the shell, also indicating that the shell is relatively dense. It may enhance the structural stability of the material, and thereby improve the cycling performance and safety of the material.

(4) According to the preferred embodiments of the present invention, some pores in the positive electrode material, when under pressure, may have increased pore volumes as the pressure increases. It may be attributable to the fact that the pressure may open closed pores in the positive electrode material to expose new voids. It means that the positive electrode material in accordance with the present disclosure can alleviate problems resulted from collapsing of the positive electrode material due to the pressure generated during battery operation, thereby improve the cycling performance of the battery.

BRIEF DESCRIPTION OF THE DRAWINGS

The accompanying drawings are included to provide a further understanding of the invention and are a part of this specification, which, together with the following detail description, illustrate the invention but are not intended to limit the scope thereof. In the drawings.

DETAILED DESCRIPTION

Figure 1:
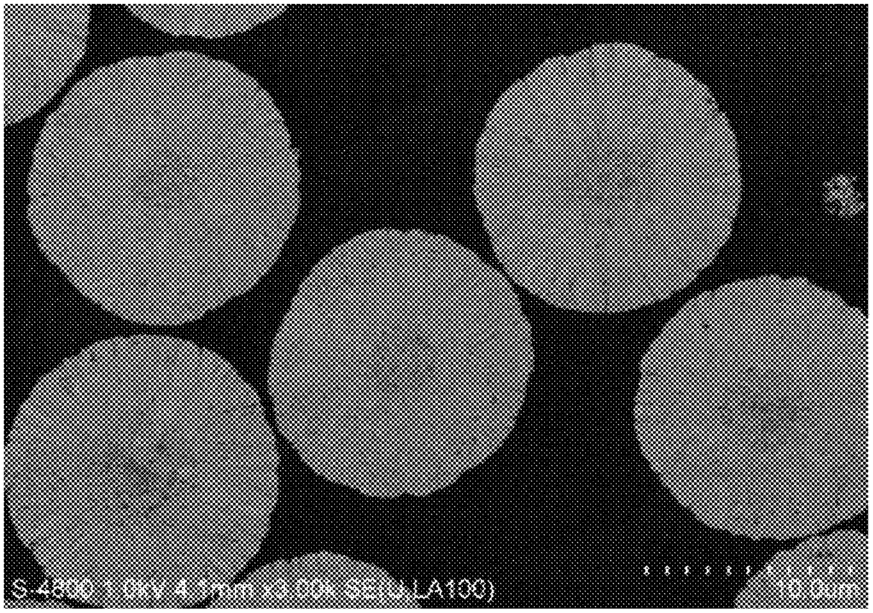
FIG. 1 shows the SEM image of the positive electrode material of Example 1.

Other than in the examples, all numerical values of parameters in this specification are to be understood as being modified in all instances by the term "about", whether or not "about" actually appears before the numerical value.

In one embodiment, the present disclosure relates to a positive electrode material for lithium-ion batteries, which is in a form of secondary particles having a core and a shell, wherein the core has a porosity greater than that of the shell.

As used in the specification, the term "secondary particles" refers to particles formed by aggregation of a plurality of primary particles. In one embodiment, the secondary particles in accordance with the present disclosure have a spherical or nearly spherical shape, such as an ellipsoid. In one variant, the secondary particles in accordance with the present disclosure have a particle size in the order of micrometer, such as 1-100 micrometers.

Usually, the positive electrode material containing nickel is in a form of flakes, which accumulate into the primary particles. The primary particles have an elongated shape with a maximum dimensional size of 300-500 nm.

The primary particles per se can be porous. At the same time, the secondary particles composed of the primary particles can be porous. There are voids between the primary particles that make up the secondary particles. Therefore, as a whole, the positive electrode material is in a porous structure. The porous structure includes macropores (with a diameter of 50-500 nm), mesopores (20-50 nm), and micropores (2-20 nm). The porosity of the positive electrode material in accordance with the present disclosure is mainly attributable to the macropores. Those macropores are mainly voids between the primary particles.

The porous structure of the positive electrode material in accordance with the present disclosure can be defined by "porosity". In the present disclosure, porosity=$(1-\rho1/\rho2)*100\%$, wherein $\rho1$ is the compacted density, $\rho2$ is the true density. The compacted density refers to the measurement value for density of the positive electrode material when it is compressed under external force to fill the voids (or macropores) between the primary particles in the positive electrode material. The true density refers to the measurement value for density of the positive electrode material when it is fully compressed to remove all pores. The compacted density and the true density can be directly measured using a compacted density meter and a true density meter, respectively.

In a process for testing the compacted density in accordance with the present disclosure, the positive electrode material is uniformly pressurized for 30 minutes to 20 kN.

In one variant, the core has a porosity of 50-90%, preferably 60-80%, and the shell has a porosity of 10-50%, preferably 20-40%. Preferably, the ratio of the porosity of the core to that of the shell is greater than 1.2, preferably greater than 1.5, for example 1.5-5.0, preferably 2.0-2.5.

In one variant, the core comprises macropores with a pore size of 50-500 nm, with a porosity of 60-80%, preferably 65-75% for the macropores in the core; and the shell comprises macropores with a pore size of 50-500 nm, with a porosity of 20-40%, preferably 25-35% for the macropores in the shell.

In a variant, the pore volume of the positive electrode material increases as the pressure applied to the positive electrode material increases. Preferably, the pore volume under pressure of the pores with a pore size of 50-110 nm in the positive electrode material may be recorded as PVi, where i=0, 1, 2, 3 and 4, respectively corresponding to the pore volumes of the pores when subjected to 0 tons, 1.5 tons, 2.5 tons, 3.5 tons and 4.5 tons of pressure applied to the positive electrode material. The pore volume under pressure satisfies the following formula: $1<PV_1/PV_0<1.5$, $1<PV_2/PV_0<4.0$, $1<PV_3/PV_0<6.0$ and $1<PV_4/PV_0<8$; preferably $1<PV_1/PV_0<1.4$, $1<PV_2/PV_0<3.5$, $1<PV_3/PV_0<5.5$ and $1<PV_4/PV_0<7.5$.

There is not any specific limitation on the composition of the positive electrode material in the present disclosure. It can be a doped nickel containing positive electrode material commonly used in the art. In a variant, the average composition of the positive electrode material is: $Li_{0.6+\delta}[(Ni_{x1}Co_{y1}M_{1-x1-y1}D_{\eta1})_z\cdot(Ni_{x2}Co_{y2}M_{1-x2-y2}G_{\eta2})_{1-z}]O_2$, $0\leq\delta\leq0.6$, $0.6\leq x1\leq1$, $0.6\leq x2\leq1$, $0\leq y1\leq0.4$, $0\leq y2\leq0.4$, $0<z<1$, $0\leq\eta1\leq0.1$, $0\leq\eta2\leq0.1$, where M is one or two of Mn and Al, D is one or more of Mo, Ti, Y, W, Ta, Nb, Cr, Sm, Sb, V, La, Ca, Hf and Zr, and G is one or more of Mo, Ta, Zn, Ti, Y, Zr, W, Nb, Cr, Sm, Al, V, La, Ca, Sb, Hf, Mg and B. Preferably, in the positive electrode material, $0.7\leq x1<1$, $0.7\leq x2<1$, $0<y1\leq0.3$, $0<y2\leq 0.3$, $0<\eta1\leq0.05$, $0<\eta2\leq0.05$, $0.4\leq z\leq0.5$, $1-x1-y1-\eta1$ is not 0, and $1-x2-y2-\eta2$ is not 0.

In one variant, D and G are in a concentration gradient in the core and shell of the positive electrode material, respectively. Preferably, in the positive electrode material, the concentration of D gradually decreases radially from the center of the core to the surface of the core, and the concentration of G gradually increases radially from the surface of the core to the surface of the shell. In the positive electrode material, nickel, cobalt and M (i.e., manganese and/or aluminum) may respectively be in a concentration gradient. For example, the concentration of manganese gradually increases radially from the center of the core to the surface of the core, and the concentration of nickel gradually decreases radially from the surface of the core to the surface of the shell.

In a further embodiment, provided in the present disclosure is a method for preparing a positive electrode material for lithium-ion batteries, wherein the positive electrode material is in a form of secondary particles having a core and a shell, and the method is characterized by comprising the steps of:

(1) subjecting a solution of soluble salts containing Ni, Co and M and a dispersion containing D to the first co-precipitation, to form the core of the secondary particles;

(2) subjecting a solution of soluble salts containing Ni, Co and M and a dispersion containing G to a second co-precipitation in the presence of the core in step (1), to form the shell on the core, to obtain the secondary particles having the core and the shell;

wherein the first co-precipitation is operated at a pH lower than that for the second co-precipitation, and a temperature lower than that for the second co-precipitation, and wherein the core has a porosity greater than that of the shell; and wherein the first co-precipitation is operated at a pH lower than that for the second co-precipitation, and a temperature lower than that for the second co-precipitation, and (3) converting the secondary particles obtained in step (2) into the positive electrode material by:

contacting the secondary particles obtained in step (2) with a lithium source material at 300-1000° ° C. to obtain the positive electrode material, wherein the lithium source material is one or more of $Li_2O$, LiOH, $LiOH{\cdot}H_2O$, $LiNO_3$ and $Li_2CO_3$, wherein M is one or two of Mn and Al, D is one or more of Mo, Ti, Y, W, Ta, Nb, Cr, Sm, Sb, V, La, Ca, Hf and Zr, and G is one or more of Mo, Ta, Zn, Ti, Y, Zr, W, Nb, Cr, Sm, Al, V, La, Ca, Sb, Hf, Mg and B.

In one variant, the step (1) comprises: operating the first co-precipitation at a pH of 9-12.5, preferably 10-12; and the step (2) comprises: operating the second co-precipitation at a pH of 10-13, preferably 11-13. Preferably, the pH used for the first co-precipitation is 0.5-2, preferably 0.5-1 lower than that used for the second co-precipitation. Preferably, the step (1) comprises: operating the first co-precipitation at a temperature of 45-65° C., preferably 50-60° C.; and the step (2) comprises: operating the second co-precipitation at a temperature of 50-70° C., preferably 55-65° ° C.

In one variant, the step (1) comprises: operating the first co-precipitation in the presence of a complexing agent; and the step (2) comprises: operating the second co-precipitation in the presence of a complexing agent. Preferably, the complexing agent used for the first co-precipitation is in a concentration of 5-12 mol/L, preferably 7-10 mol/L; and the complexing agent used for the second co-precipitation is in a concentration of 0.1-5 mol/L, preferably 0.5-4.5 mol/L. Preferably, the complexing agent used for the first co-precipitation is in a concentration higher than that used for the second co-precipitation, for example, 3.0-9.0 mol/L higher than that. The complexing agent used for the first co-precipitation is the same or different from that used for the second co-precipitation. The complexing agent is one or more selected from the group consisting of ammonia, ammonium sulfate, ammonium chloride and ammonium nitrate.

In one variant, the soluble salt of nickel is one or more selected from the group consisting of nickel sulfate, nickel chloride, nickel nitrate and nickel acetate. The soluble salt of cobalt is one or more selected from the group consisting of cobalt sulfate, cobalt chloride, cobalt nitrate and cobalt acetate. When M is manganese, the soluble salt of manganese is one or more selected from the group consisting of manganese sulfate, manganese chloride, manganese nitrate and manganese acetate. When M is aluminum, the soluble salt of the aluminum is one or more selected from the group consisting of sodium metaaluminate and alumina sol.

In one variant, the dispersion of D may be a sol containing elemental D or a solution containing soluble salts of D, such as a solution of one or more selected from the group consisting of sulfate, chloride and nitrate of D.

In one variant, the dispersion of G may be a sol containing elemental G or a solution containing soluble salts of G, such as a solution of one or more selected from the group consisting of sulfate, chloride and nitrate of G.

In a variant, the concentration or flow rate of the dispersion of D is controlled in step (1), so as to make the concentration of D gradually decrease radially from the center of the core to the surface of the core. The concentration or flow rate of the dispersion of G is controlled in step (2), so as to make the concentration of G gradually increase radially from the surface of the core to the surface of the shell. Preferably, the dispersion of D is added at a gradually decreasing concentration in step (1), and the dispersion of G is added at a gradually increasing concentration in step (2). Preferably, the dispersion of D is added at a gradually decreasing flow rate in step (1), and the dispersion of G is added at a gradually increasing flow rate in step (2).

In a variant, one or two of precipitants, antioxidants and processing aids are added to the first and second co-precipitation. The precipitants are one or more selected from the group consisting of sodium hydroxide, potassium hydroxide and lithium hydroxide. The antioxidants are one or more selected from the group consisting of ascorbic acid, sodium bisulfite and tea polyphenols. The processing aids are one or more selected from the group consisting of polyvinyl pyrrolidone, polyvinyl alcohol and sodium dodecyl sulfate. The added amounts of precipitants, antioxidants and processing aids are well-known to those skilled persons in the art.

In a variant, the first and second co-precipitations may be operated under a protective atmosphere. The protective atmosphere is one or more selected from the group consisting of nitrogen and inert gases. The inert gases may be for example argon.

In a variant, the step (3) of converting the secondary particles obtained in step (2) into the positive electrode material may comprise: calcining the secondary particles obtained in step (2) with a lithium source material at 300-1000° ° C., preferably 500-900° C. for 1-36 hours, preferably 6-24 hours. Preferably, the lithium source material is one or more of $Li_2O$, LiOH, $LiOH{\cdot}H_2O$, LiNO3 and $Li_2CO_3$, preferably LiOH or $LiOH{\cdot}H_2O$. Preferably, the calcining is operated under an atmosphere containing oxygen, such as in the presence of air or oxygen.

The positive electrode material in accordance with the present disclosure may be used in secondary batteries, such as lithium-ion batteries. Lithium-ion batteries may comprise a negative electrode, a positive electrode, a separator and an electrolyte.

The positive electrode includes a positive electrode material layer on the positive current collector, wherein the positive electrode material layer comprises the positive electrode material in accordance with the present disclosure. The positive electrode material layer may further comprise an binder and a conductive agent. The binder may be resin materials selected from polyvinylidene fluoride (PVDF), polytetrafluoroethylene (PTFE), polyacrylonitrile (PAN), styrene butadiene rubber (SBR), carboxymethyl cellulose (CMC) and the like. The conductive agent may include carbon-based materials or conductive polymers. The carbon-based materials may comprise, for example, graphite, acetylene black, carbon fibers, nanotubes, graphene and carbon black. The conductive polymers may include polyaniline, polythiophene, polyacetylene, polypyrrole and the like. The current collector may include at least one of stainless steel, aluminum, nickel, iron, titanium, copper, tin or any other conductive materials known to those skilled in the art. In some variants, the current collector may be precoated, such as carbon coated aluminum foil.

There is not any specific limitation on the composition of the negative electrode in the present disclosure. It may be a negative electrode commonly used in the art, such as a lithium metal sheet.

There is not any specific limitation on the composition of the separator in the present disclosure. It may be a separator commonly used in the art. For example, the separator may be a porous membrane made of polyolefins such as polytetrafluoroethylene, polypropylene or polyethylene.

The electrolyte may be various conventional electrolytes, such as non-aqueous electrolyte. The non-aqueous electrolyte is a solution formed by an electrolyte lithium salt in a non-aqueous solvent. Any traditional non-aqueous electrolyte known to those skilled persons in the art may be used. For example, the electrolyte may be at least one selected from the group consisting of lithium hexafluorophosphate ($LiPF_6$), lithium perchlorate ($LiClO_4$), lithium tetrafluoroborate ($LiBF_4$), lithium hexafluoroarsenate ($LiAsF_6$) and lithium hexafluorosilicate ($LiSiF_6$). The non-aqueous solvent may be selected from the group consisting of linear esters, cyclic esters and mixtures thereof. The linear esters may be at least one selected from the group consisting of dimethyl carbonate (DMC), diethyl carbonate (DEC), methyl ethyl carbonate (EMC), methyl propyl carbonate (MPC) and dipropyl carbonate (DPC). The cyclic esters may be at least one selected from the group consisting of ethylene carbonate (EC), propylene carbonate (PC) and vinylene carbonate (VC).

EXAMPLES

The features and advantages of the present invention are apparent from the following examples. The examples are intended to illustrate and not to limit the invention in any way.

Testing Methods

1. Testing by Scanning Electron Microscope

The morphology of the sample was characterized by using a scanning electron microscope. Specifically, the Smartlab tester from Hitachi High Tech Group was used for the testing with magnification of 3000 and 10000 times respectively.

2. Testing for Compacted Density

The compacted density of the sample was characterized by using a compacted density meter. Specifically, the MCP-PD51 tester from Mitsubishi Chemical, Japan was used, where the sample was uniformly pressurized for 30 minutes to 20 kN and the test results were obtained from the testing software.

3. Testing for True Density

The true density of the sample was characterized by using a true density meter. Specifically, the AccuPyc13400 tester from Micromeritics, US was used, wherein the test results were obtained from the testing software.

4. Testing for Pore Size and Pore Volume

The adsorption curve of the sample was obtained by using the Tri-star 3020 specific surface analyzer from Micromeritics, US. The sample was pretreated at conditions of a heating temperature of 300° C. and a degassing time of 120 minutes. The pore size of the sample was calculated according to the BJH method and the pore volume of the sample was calculated according to the BET method.

5. Testing for the Change in Pore Volume Under Pressure 3 g of the sample was applied a pressure of 0 tons, 1.5 tons, 2.5 tons, 3.5 tons and 4.5 tons respectively to obtain the compressed samples. The above testing for pore size and pore volume was repeated with each of the compressed samples to obtain data of the pore volumes for pores with a pore size of 90±10 nm, namely $PV_0$, $PV_1$, $PV_2$, $PV_3$ and $PV_4$. The ratios of $PV_1$, $PV_2$, $PV_3$ and $PV_4$ to $PV_0$ were respectively calculated to characterize the change in pore volume under pressure for the pores with a pore size of 90±10 nm.

6. Testing for Battery Performances 6.1 Preparation of Battery Samples:

9.2 g of the positive electrode active material sample, 0.4 g of acetylene black and 0.4 g of polyvinylidene fluoride (PVDF) were mixed to form a positive electrode slurry. The positive electrode slurry was coated on an aluminum foil, dried, pressed under a pressure of 100 Mpa into a shape with a diameter of 12 mm and a thickness of 120 μm, and then dried in a vacuum drying oven at 120° ° C. for 12 hours to obtain the positive electrode plate.

A Li metal sheet with a diameter of 17 mm and a thickness of 1 mm was used as the negative electrode. A porous film of polyethylene with a thickness of 25 μm was used as the separator. A solution of 1.0 mol/L $LiPF_6$ was used as the electrolyte, wherein a mixture of ethylene carbonate (EC) and diethyl carbonate (DEC) in equivalent amounts was used as the solvent.

A 2025 coin cell was assembled by using the positive electrode plate, the separator, the negative electrode plate and the electrolyte.

6.2 Performance Evaluation of the Cell Samples:

(1) Initial Specific Discharge Capacity:

The prepared coin cell sample was set for 24 hours. The sample was charged at a current density of 20 mA/g to the cutoff voltage of 4.3 V, and charged at a constant voltage of 4.3 V for 30 minutes. Then it was discharged at a current density of 20 mA/g to the cutoff voltage of 3.0 V. The discharge time was recorded. The initial specific discharge capacity of the cell sample=the current density*the discharge time.

(2) Cycling Performance:

The cell sample was charged and discharged twice at a current density of 20 mA/g and a cutoff voltage of 3.0-4.3 V to complete the activation of the same. The activated cell sample was subjected to a specified number of charge and discharge cycles, such as 80 cycles, at a current density of 1 C, a voltage range of 3.0-4.3 V and a temperature of 45° C. As mentioned above, the specific discharge capacity at each cycle was obtained from the current density and the discharge time of each cycle. The cycling performance of the cell sample was characterized by capacity retention at high temperatures, where the capacity retention at high temperatures=the specific discharge capacity at the specified cycle/the initial specific discharge capacity*100%.

Comparative Example 1

Nickel sulfate, cobalt sulfate and manganese sulfate were mixed in a molar ratio of 0.88:0.05:0.07 to form a 1.5 mol/L aqueous solution of transition metal salts. Nano $ZrO_2$ was mixed with water to form a 0.5 mol/L solution of Zr dopant. The aqueous solution of transition metal salts, the solution of Zr dopant, 6.0 mol/L NaOH and 3.0 mol/L $NH_3 \cdot H_2O$ were slowly added to a reactor under stirring. Co-precipitation was operated at a pH of 12.0 and a temperature of 55° C. under a $N_2$ atmosphere. After 70 hours of the reaction, secondary particles with a total particle size of 14.2 μm were obtained.

Corresponding to a ratio of Li/(Ni+Co+Mn)=1.04, the secondary particles were mixed with lithium hydroxide and calcined under an oxygen atmosphere at 735° ° C. for 15 hours to obtain a comparative positive electrode material CC-1, which had the composition of $Li_{1.04}Ni_{0.88}Co_{0.05}Mn_{0.06}Zr_{0.01}O_2$.

The performances of the comparative positive electrode material CC-1 were tested as described above. The test results showed that the comparative positive electrode material CC-1 was not in a core-shell structure, and the comparative positive electrode material CC-1 had a porosity of 65%. The change in pore volume under pressure in the comparative positive electrode material CC-1 was as follows:

for the pore volume corresponding to a pore size of 90±10 nm, $PV_1/PV_0$=0.1, $PV_2/PV_0$=0.3, $PV_3/PV_0$=0.6 and $PV_4/PV_0$=0.7.

Figure 4:
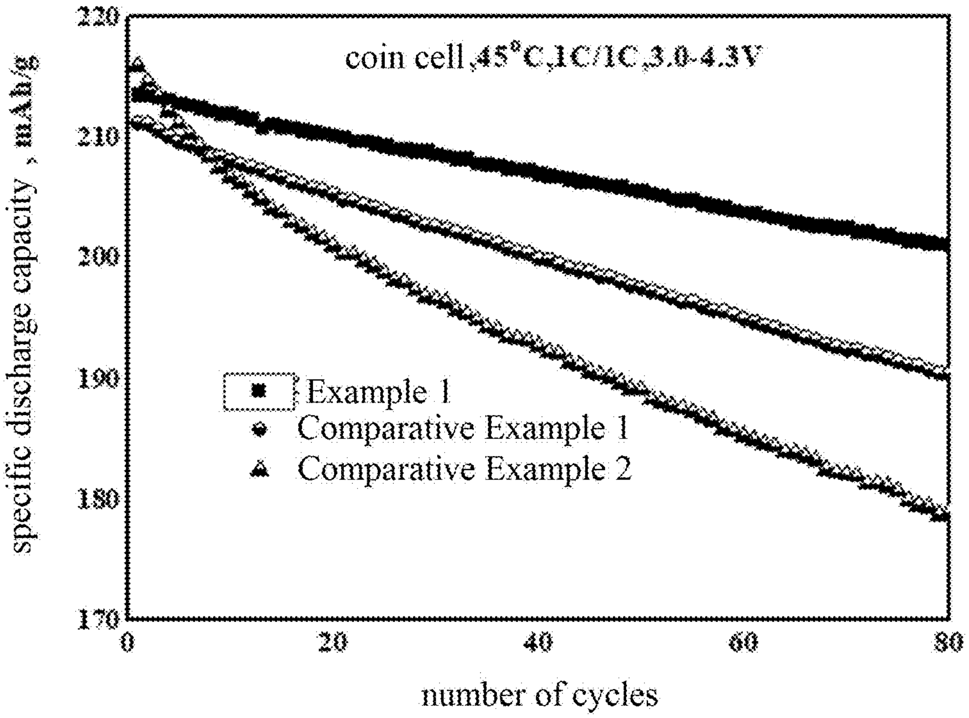
FIG. 4 shows the cycling performances of coin cells prepared with the positive electrode materials of Example 1, Comparative Examples 1 and 2.

The cycling performance of the coin cell prepared by using the comparative positive electrode material CC-1 of Comparative Example 1 was shown in FIG. 4.

Comparative Example 2

Nickel sulfate, cobalt sulfate and manganese sulfate were mixed in a molar ratio of 0.88:0.05:0.07 to form a 1.5 mol/L aqueous solution of transition metal salts. Nano $ZrO_2$ was mixed with water to form a 0.5 mol/L solution of Zr dopant. The aqueous solution of transition metal salts, the solution of Zr dopant, 6.0 mol/L NaOH and 3.0 mol/L $NH_3 \cdot H_2O$ were slowly added to a reactor under stirring. The first co-precipitation was operated at a pH of 12.5 and a temperature of 60° C. under a $N_2$ atmosphere. After 40 hours of the first co-precipitation, the second co-precipitation was operated at a pH of 11.0, with 8.0 mol/L $NH_3 \cdot H_2O$, at a temperature of 55° C. and under a $N_2$ atmosphere. After 30 hours of the second co-precipitation, secondary particles with a total particle size of 14.1 μm were obtained.

Corresponding to a ratio of Li/(Ni+Co+Mn)=1.04, the secondary particles were mixed with lithium hydroxide and calcined under an oxygen atmosphere at 735° C. for 15 hours to obtain a comparative positive electrode material CC-2, which had the composition of $Li_{1.04}Ni_{0.88}Co_{0.05}Mn_{0.06}Zr_{0.01}O_2$.

The performances of the comparative positive electrode material CC-2 were tested as described above. The test results showed that the comparative positive electrode material CC-2 was in a core-shell structure, wherein the core had a radius of 1.5 μm, as shown in the scanning electron microscope testing results. The results of the testing for pore size, porosity and pore volume showed that the shell had a porosity of 71%, and the core had a porosity of 30%. The change in pore volume under pressure in the comparative positive electrode material CC-2 was as follows:

for the pore volume corresponding to a pore size of 90±10 nm, $PV_1/PV_0$=0.05, $PV_2/PV_0$=0.1, $PV_3/PV_0$=0.6 and $PV_4/PV_0$=1.233.

The cycling performance of the coin cell prepared by using the comparative positive electrode material CC-2 of Comparative Example 2 was shown in FIG. 4.

Comparative Example 3

Nickel sulfate, cobalt sulfate and manganese sulfate were mixed in a molar ratio of 0.97:0.02:0.01 to form a 1.5 mol/L aqueous solution (1) of transition metal salts. Nickel sulfate, cobalt sulfate and manganese sulfate were mixed in a molar ratio of 0.94:0.02:0.04 to form a 1.5 mol/L aqueous solution (2) of transition metal salts. Nano $Nb_2O_5$ was mixed with water to form a 0.5 mol/L solution (3) of Nb dopant and a 0.01 mol/L solution (4) of Nb dopant, respectively. The aqueous solution (2) of transition metal salts was added into the aqueous solution (1) of transition metal salts at a flow rate of 0.2 L/h to form a mixed aqueous solution of transition metal salts, and the solution (4) of Nb dopant was added into the solution (3) of Nb dopant at a flow rate of 0.1 L/h to form a mixed solution of Nb dopant. At the same time, the mixed aqueous solution of transition metal salts, the mixed solution of Nb dopant, 6.0 mol/L NaOH and 3.0 mol/L $NH_3 \cdot H_2O$ were slowly added to a reactor under stirring. The first co-precipitation was operated at a pH of 12.0 and a temperature of 55° C. under a $N_2$ atmosphere. The first co-precipitation was operated for 40 hours.

Nickel sulfate, cobalt sulfate and manganese sulfate were mixed in a molar ratio of 0.86:0.05:0.09 to form a 1.5 mol/L aqueous solution (5) of transition metal salts. Nano $ZrO_2$ was mixed with water to form a 0.01 mol/L solution (6) of Zr dopant and a 1.0 mol/L solution (7) of Zr dopant respectively. The solution (7) of Zr dopant was added into the solution (6) of Zr dopant at a flow rate of 0.1 L/h to form a mixed solution of Zr dopant. At the same time, under stirring, the aqueous solution (5) of transition metal salts, the mixed solution of Zr dopant, 6.0 mol/L NaOH and 3.0 mol/L $NH_3 \cdot H_2O$ were slowly added to the reactor wherein the first co-precipitation was just finished. The second co-precipitation was operated at a pH of 12 and a temperature of 55° C. under a $N_2$ atmosphere. After 30 hours of the second co-precipitation, the adding of the aqueous solution (5) of transition metal salts was stopped. After further 0.5 hours of reaction, secondary particles with a total particle size of 14.0 μm were obtained.

Corresponding to a ratio of Li/(Ni+Co+Mn)=1.04, the secondary particles were mixed with lithium hydroxide and calcined under an oxygen atmosphere at 735° C. for 15 hours to obtain a comparative positive electrode material CC-3, which had the composition of $Li[(Ni_{0.95}Co_{0.02}Mn_{0.02}Nb_{0.01})_{0.014} \cdot (Ni_{0.875}Co_{0.05}Mn_{0.07}Zr_{0.005})_{0.986}]O_2$. In the core of the comparative positive electrode material CC-3, the Nb content decreased radially from the center of the core to the surface of the core, from a molar content of 0.02 mol % to 0; while the Mn content increased radially from the center of the core to the surface of the core, from a molar content of 0.01 mol % to 0.03 mol %; and the total amount of Nb and Mn remained at 0.03 mol %. In the shell of the comparative positive electrode material CC-3, the Zr content increased radially from the surface of the core to the surface of the shell, from a molar content of 0 to 0.01 mol %; while the Ni content decreased radially from the surface of the core to the surface of the shell, from a molar content of 0.91 mol % to 0.85 mol %. Additionally, the Mn content increased radially from the surface of the core to the surface of the shell, from a molar content of 0.04 mol % to 0.08 mol %.

The performances of the comparative positive electrode material CC-3 were tested as described above. The test results showed that the comparative positive electrode material CC-3 was in a core-shell structure, wherein the core had a radius of 1.7 μm, as shown in the scanning electron microscope testing results. The results of the testing for pore size, porosity and pore volume showed that the shell had a porosity of 33% and the core had a porosity of 33%. The change in pore volume under pressure in the comparative positive electrode material CC-3 was as follows:

for the pore volume corresponding to a pore size of 90±10 nm, $PV_1/PV_0=0.1$, $PV_2/PV_0=0.3$, $PV_3/PV_0=0.6$ and $PV_4/PV_0=0.8$.

The coin cell prepared by using the comparative positive electrode material CC-3 of Comparative Example 3 had a capacity retention of 91.5% after 80 cycles.

Comparative Example 3 was repeated except that the first co-precipitation was operated at a pH of 12.5, with 3.0 mol/L $NH_3 \cdot H_2O$, at a temperature of 60° C. and under a $N_2$ atmosphere; and the second co-precipitation was operated at a pH of 11.5, with 8.0 mol/L $NH_3 \cdot H_2O$, at a temperature of 55° C. and under a $N_2$ atmosphere. Obtained was the comparative positive electrode material CC-4, which had the same chemical composition as the comparative positive electrode material CC-3.

The performances of the comparative positive electrode material CC-4 were tested as described above. The test results showed that the comparative positive electrode material CC-4 was in a core-shell structure, wherein the core had a radius of 3.4 μm, as shown in the scanning electron microscope testing results. The results of the testing for pore size, porosity and pore volume showed that the shell had a porosity of 73%, and the core had a porosity of 32%. The change in pore volume under pressure in the comparative positive electrode material CC-4 was as follows:

for the pore volume corresponding to a pore size of 90+10 nm, $PV_1/PV_0=0.05$, $PV_2/PV_0=0.1$, $PV_3/PV_0=0.6$ and $PV_4/PV_0=1.2$.

The coin cell prepared by using the comparative positive electrode material CC-4 of Comparative Example 4 had a capacity retention of 89.2% after 80 cycles.

Example 1

Nickel sulfate, cobalt sulfate and manganese sulfate were mixed in a molar ratio of 0.97:0.02:0.01 to form a 1.5 mol/L aqueous solution (1) of transition metal salts. Nickel sulfate, cobalt sulfate and manganese sulfate were mixed in a molar ratio of 0.94:0.02:0.04 to form a 1.5 mol/L aqueous solution (2) of transition metal salts. Nano $Nb_2O_5$ was mixed with water to form a 0.5 mol/L solution (3) of Nb dopant and a 0.1 mol/L solution (4) of Nb dopant, respectively. The aqueous solution (2) of transition metal salts was added into the aqueous solution (1) of transition metal salts at a flow rate of 0.2 L/h to form a mixed aqueous solution of transition metal salts, and the solution (4) of Nb dopant was added into the solution (3) of Nb dopant at a flow rate of 0.1 L/h to form a mixed solution of Nb dopant. At the same time, the mixed aqueous solution of transition metal salts, the mixed solution of Nb dopant, 6.0 mol/L NaOH and 8.0 mol/L $NH_3 \cdot H_2O$ were slowly added to a reactor under stirring. The first co-precipitation was operated at a pH of 11.0 and a temperature of 53° C. under a $N_2$ atmosphere. The first co-precipitation was operated for 60 hours.

Nickel sulfate, cobalt sulfate and manganese sulfate were mixed in a molar ratio of 0.86:0.05:0.09 to form a 1.5 mol/L aqueous solution (5) of transition metal salts. Nano $ZrO_2$ was mixed with water to form a 0.01 mol/L solution (6) of Zr dopant and a 1.0 mol/L solution (7) of Zr dopant respectively. The solution (7) of Zr dopant was added into the solution (6) of Zr dopant at a flow rate of 0.1 L/h to form a mixed solution of Zr dopant. At the same time, under stirring, the aqueous solution (5) of transition metal salts, the mixed solution of Zr dopant, 6.0 mol/L NaOH and 3.0 mol/L $NH_3 \cdot H_2O$ were slowly added to the reactor wherein the first co-precipitation was just finished. The second co-precipitation was operated at a pH of 11.5 and a temperature of 58° C. under a $N_2$ atmosphere. After 40 hours of the second co-precipitation, the adding of the aqueous solution (5) of transition metal salts was stopped. After further 0.5 hours of reaction, secondary particles with a total particle size of 14.0 μm were obtained.

Corresponding to a ratio of Li:(Ni+Co+Mn)=1.04, the secondary particles were mixed with lithium hydroxide and calcined under an oxygen atmosphere at 735° C. for 15 hours to obtain a positive electrode material C-1, which had the composition of $Li\ [(Ni_{0.95}Co_{0.02}Mn_{0.02}Nb_{0.01})_{0.014} \cdot (Ni_{0.875}Co_{0.05}Mn_{0.07}Zr_{0.005})_{0.986}]O_2$. In the core of the positive electrode material C-1, the Nb content decreased radially from the center of the core to the surface of the core, from a molar content of 0.02 mol % to 0; while the Mn content increased radially from the center of the core to the surface of the core, from a molar content of 0.01 mol % to 0.03 mol %; and the total amount of Nb and Mn remained at 0.03 mol %. In the shell of the positive electrode material C-1, the Zr content increased radially from the surface of the core to the surface of the shell, from a molar content of 0 to 0.01 mol %; while the Ni content decreased radially from the surface of the core to the surface of the shell, from a molar content of 0.91 mol % to 0.85 mol %. Additionally, the Mn content increased radially from the surface of the core to the surface of the shell, from a molar content of 0.04 mol % to 0.08 mol %.

The performances of the positive electrode material C-1 were tested as described above.

Figure 2:
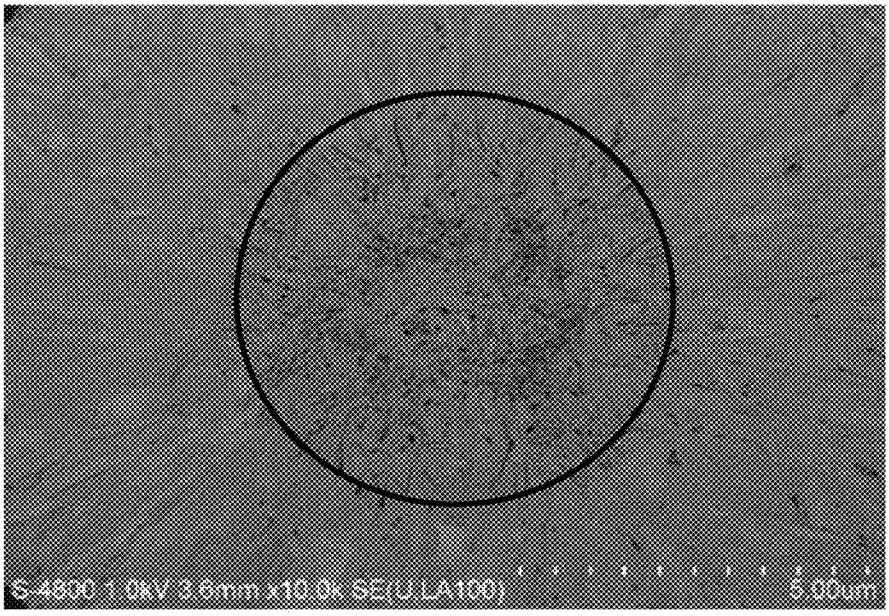
FIG. 2 shows the SEM image of a local cross-section of the positive electrode material of Example 1.
Figure 3:
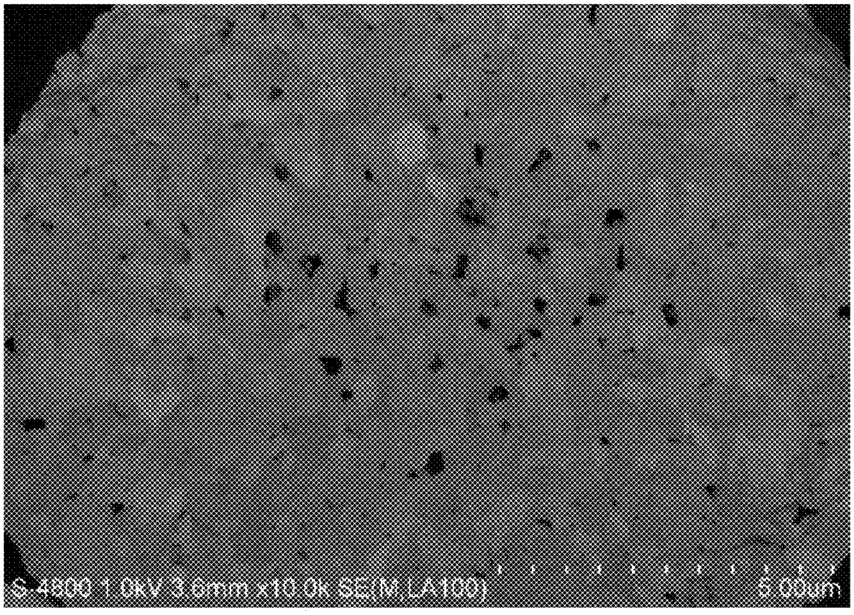
FIG. 3 shows the SEM image of a local cross-section of the positive electrode material of Example 1.

The results of the scanning electron microscope testing were showed in FIG. 1 to FIG. 3. As shown in FIG. 1 to FIG. 3, the positive electrode material C-1 was spherical particles in a core-shell structure, wherein the core had a radius of 1.7 μm, and the shell had an outer radius of 5.3 μm. The core and the shell had different voids.

The results of the testing for pore size, porosity and pore volume showed that the core had a porosity of 70%, and the shell had a porosity of 32%. The change in pore volume under pressure in the positive electrode material C-1 was as follows:

for the pore volume corresponding to a pore size of 90±10 nm, $PV_1/PV_0=0.6$, $PV_2/PV_0=2.7$, $PV_3/PV_0=3.5$ and $PV_4/PV_0=4.9$.

The cycling performance of the coin cell prepared by using the positive electrode material C-1 of Example 1 was shown in FIG. 4. As shown in FIG. 4, compared with the comparative positive electrode materials of Comparative Examples 1 and 2, the positive electrode material C-1 of Example 1 achieved higher capacity retention after the same number of cycles. The coin cell prepared by using the positive electrode material C-1 of Example 1 had a capacity retention of 93.9% after 80 cycles.

Example 2

Nickel sulfate, cobalt sulfate and manganese sulfate were mixed in a molar ratio of 0.89:0.055:0.055 to form a 1.5 mol/L aqueous solution (1) of transition metal salts. Nano $ZrO_2$ was mixed with water to form a 0.5 mol/L solution (2) of Zr dopant. Nano $Nb_2O_5$ was mixed with water to form a 0.5 mol/L solution (3) of Nb dopant. The aqueous solution (1) of transition metal salts, the solution (2) of Zr dopant, the solution (3) of Nb dopant, 6.0 mol/L NaOH and 8.0 mol/L $NH_3 \cdot H_2O$ were slowly added to a reactor under stirring. The first co-precipitation was operated at a pH of 11.5 and a temperature of 54° C. under a $N_2$ atmosphere. After 60 hours of the first co-precipitation, the second co-precipitation was operated at a pH of 12.5, with 2.5 mol/L $NH_3 \cdot H_2O$, at a temperature of 58° C. under a $N_2$ atmosphere. After 40 hours of the second co-precipitation, secondary particles with a total particle size of 14.1 μm were obtained.

Corresponding to a ratio of Li:(Ni+Co+Mn)=1.04, the secondary particles were mixed with lithium hydroxide and calcined under an oxygen atmosphere at 735° C. for 15 hours to obtain a positive electrode material C-2, which had the composition of $Li_{1.05}$ $[(Ni_{0.95}Co_{0.05}Mn_{0.015}Nb_{0.015})_{0.10}\cdot(Ni_{0.905}Co_{0.05}Mn_{0.035}Zr_{0.01})_{0.90}]O_2$.

The performances of the positive electrode material C-2 were tested as described above.

As shown in the results of the scanning electron microscope testing, the positive electrode material C-2 was in a core-shell structure, wherein the core had a radius of 1.5 μm, and the shell had an outer radius of 5.6 μm. The core and the shell had different voids.

As shown in the testing results of pore size, porosity and pore volume, the core had a porosity of 65%, and the shell had a porosity of 30%. The change in pore volume under pressure in the positive electrode material C-2 was as follows:

for the pore volume corresponding to a pore size of 90±10 nm, $PV_1/PV_0$=0.4, $PV_2/PV_0$=1.8, $PV_3/PV_0$=2.7 and $PV_4/PV_0$=3.7.

The coin cell prepared by using the positive electrode material C-2 of Example 2 had a capacity retention of 93.1% after 80 cycles.

Example 3

Nickel sulfate, cobalt sulfate and manganese sulfate were mixed in a molar ratio of 0.97:0.02:0.01 to form a 1.5 mol/L aqueous solution (1) of transition metal salts. Nickel sulfate, cobalt sulfate and manganese sulfate were mixed in a molar ratio of 0.94:0.02:0.04 to form a 1.5 mol/L aqueous solution (2) of transition metal salts. Nano $Nb_2O_5$ was mixed with water to form a 2 mol/L solution (3) of Nb dopant and a 0.05 mol/L solution (4) of Nb dopant, respectively. The aqueous solution (2) of transition metal salts was added into the aqueous solution (1) of transition metal salts at a flow rate of 0.2 L/h to form a mixed aqueous solution of transition metal salts, and the solution (4) of Nb dopant was added into the solution (3) of Nb dopant at a flow rate of 0.1 L/h to form a mixed solution of Nb dopant. At the same time, the mixed aqueous solution of transition metal salts, the mixed solution of Nb dopant, 6.0 mol/L NaOH and 9.0 mol/L $NH_3 \cdot H_2O$ were slowly added to a reactor under stirring. The first co-precipitation was operated at a pH of 10.0 and a temperature of 53° C. under a $N_2$ atmosphere. The first co-precipitation was operated for 58 hours.

Nickel sulfate, cobalt sulfate and manganese sulfate were mixed in a molar ratio of 0.89:0.055:0.055 to form a 1.5 mol/L aqueous solution (5) of transition metal salts. Nano ZrO2 was mixed with water to form a 0.01 mol/L solution (6) of Zr dopant and a 2.0 mol/L solution (7) of Zr dopant respectively. The solution (7) of Zr dopant was added into the solution (6) of Zr dopant at a flow rate of 0.1 L/h to form a mixed solution of Zr dopant. At the same time, under stirring, the aqueous solution (5) of transition metal salts, the mixed solution of Zr dopant, 6.0 mol/L NaOH and 2.0 mol/L $NH_3 \cdot H_2O$ were slowly added to the reactor wherein the first co-precipitation was just finished. The second co-precipitation was operated at a pH of 11.5 and a temperature of 56° ° C. under a $N_2$ atmosphere. After 44 hours of the second co-precipitation, the adding of the aqueous solution (5) of transition metal salts was stopped. After further 0.5 hours of reaction, secondary particles with a total particle size of 14.9 μm were obtained.

Corresponding to a ratio of Li:(Ni+Co+Mn)=1.05, the secondary particles were mixed with lithium hydroxide and calcined under an oxygen atmosphere at 740° C. for 15 hours to obtain a positive electrode material C-3, which had the composition of $Li_{1.05}[(Ni_{0.95}Co_{0.02}Mn_{0.015}Nb_{0.015})_{0.10}\cdot(Ni_{0.905}Co_{0.05}Mn_{0.035}Zr_{0.01})_{0.90}]O_2$. In the core of the positive electrode material C-3, the Nb content decreased radially from the center of the core to the surface of the core, from a molar content of 0.02 mol % to 0.01 mol %; while the Mn content increased radially from the center of the core to the surface of the core, from a molar content of 0.01 mol % to 0.02 mol %; and the total amount of Nb and Mn remained at 0.015 mol %. In the shell of the positive electrode material C-3, the Zr content increased radially from the surface of the core to the surface of the shell, from a molar content of 0 to 0.02 mol %; while the Ni content decreased radially from the surface of the core to the surface of the shell, from a molar content of 0.93 mol % to 0.88 mol %. Additionally, the Mn content increased radially from the surface of the core to the surface of the shell, from a molar content of 0.02 mol % to 0.05 mol %.

The performances of the positive electrode material C-3 were tested as described above.

As shown in the results of the scanning electron microscope testing, the positive electrode material C-3 was in a core-shell structure, wherein the core had a radius of 3.5 μm, and the shell had an outer radius of 4.0 μm. The core and the shell had different voids.

As shown in the testing results of pore size, porosity and pore volume, the core had a porosity of 72%, and the shell had a porosity of 32%. The change in pore volume under pressure in the positive electrode material C-3 was as follows:

for the pore volume corresponding to a pore size of 90±10 nm, $PV_1/PV_0$=0.5, $PV_2/PV_0$=2.3, $PV_3/PV_0$=3.1 and $PV_4/PV_0$=5.2.

The coin cell prepared by using the positive electrode material C-3 of Example 3 had a capacity retention of 93.1% after 80 cycles.

Example 4

Nickel sulfate, cobalt sulfate and manganese sulfate were mixed in a molar ratio of 0.87:0.02:0.11 to form a 1.5 mol/L aqueous solution (1) of transition metal salts. Nickel sulfate, cobalt sulfate and manganese sulfate were mixed in a molar ratio of 0.84:0.02:0.14 to form a 1.5 mol/L aqueous solution (2) of transition metal salts. Nano $Nb_2O_5$ was mixed with water to form a 2.0 mol/L solution (3) of Nb dopant and a 0.05 mol/L solution (4) of Nb dopant, respectively. The aqueous solution (2) of transition metal salts was added into the aqueous solution (1) of transition metal salts at a flow rate of 0.2 L/h to form a mixed aqueous solution of transition metal salts, and the solution (4) of Nb dopant was added into the solution (3) of Nb dopant at a flow rate of 0.1 L/h to form a mixed solution of Nb dopant. At the same time, the mixed aqueous solution of transition metal salts, the mixed solution of Nb dopant, 6.0 mol/L NaOH and 10.0 mol/L $NH_3 \cdot H_2O$ were slowly added to a reactor under stirring. The first co-precipitation was operated at a pH of 10.8 and a temperature of 52° C. under a $N_2$ atmosphere. The first co-precipitation was operated for 60 hours.

Nickel sulfate, cobalt sulfate and manganese sulfate were mixed in a molar ratio of 0.60:0.05:0.35 to form a 1.5 mol/L aqueous solution (5) of transition metal salts. Nano $ZrO_2$ was mixed with water to form a 0.01 mol/L solution (6) of Zr dopant and a 2.0 mol/L solution (7) of Zr dopant respectively. The solution (7) of Zr dopant was added into the solution (6) of Zr dopant at a flow rate of 0.1 L/h to form a mixed solution of Zr dopant. At the same time, under stirring, the aqueous solution (5) of transition metal salts, the mixed solution of Zr dopant, 6.0 mol/L NaOH and 4.0 mol/L $NH_3 \cdot H_2O$ were slowly added to the reactor wherein the first co-precipitation was just finished. The second co-precipitation was operated at a pH of 11.5 and a temperature of 58° C. under a $N_2$ atmosphere. After 60 hours of the second co-precipitation, the adding of the aqueous solution (5) of transition metal salts was stopped. After further 1.0 hour of reaction, secondary particles with a total particle size of 16.1 μm were obtained.

Corresponding to a ratio of Li:(Ni+Co+Mn)=1.04, the secondary particles were mixed with lithium hydroxide and calcined under an oxygen atmosphere at 780° C. for 15 hours to obtain positive electrode material C-4, which had the composition of Li1.04 $[(Ni_{0.85}Co_{0.02}Mn_{0.115}Nb_{0.015})_{0.18} \cdot (Ni_{0.675}Co_{0.05}Mn_{0.255}Zr_{0.02})_{0.82}]O_2$. In the core of the positive electrode material C-4, the Nb content decreased radially from the center of the core to the surface of the core, from a molar content of 0.04 mol % to 0; while the Mn content increased radially from the center of the core to the surface of the core, from a molar content of 0.06 mol % to 0.1 mol %; and the total amount of Nb and Mn remained at 0.1 mol %. In the shell of the positive electrode material C-4, the Zr content increased radially from the surface of the core to the surface of the shell, from a molar content of 0 to 0.04 mol %; while the Ni content decreased radially from the surface of the core to the surface of the shell, from a molar content of 0.85 mol % to 0.6 mol %. Additionally, the Mn content increased radially from the surface of the core to the surface of the shell, from a molar content of 0.1 mol % to 0.31 mol %.

The performances of the positive electrode material C-4 were tested as described above.

As shown in the results of the scanning electron microscope testing, the positive electrode material C-4 was in a core-shell structure, wherein the core had a radius of 4.5 μm, and the shell had an outer radius of 3.5 μm. The core and the shell had different voids.

As shown in the testing results of pore size, porosity and pore volume, the shell had a porosity of 32%, and the core had a porosity of 72%. The change in pore volume under pressure in the positive electrode material C-4 was as follows:

for the pore volume corresponding to a pore size of 90±10 nm, $PV_1/PV_0=0.7$, $PV_2/PV_0=2.9$, $PV_3/PV_0=3.8$ and $PV_4/PV_0=5.5$.

The coin cell prepared by using the positive electrode material C-4 of Example 4 had a capacity retention of 92.5% after 80 cycles.

Finally, it should be understood that the above examples are only used to illustrate the technical solutions of the present invention, not to limit them. Although the present invention has been described in detail with reference to the above examples, those skilled persons in the art should understand that modifications may be made to the technical solutions outlined in the above examples, or replacements may be made to some or all of the technical features therein. Those modifications or replacements do not make the corresponding technical solutions substantially away from the scope of the technical solutions of the various embodiments of the present invention.

The embodiments of the invention in which an exclusive property or privilege is claimed are defined as follows:

1. A positive electrode material for lithium-ion batteries, which is in a form of secondary particles having a core and a shell, wherein the core has a porosity greater than that of the shell;

wherein the positive electrode material is a doped nickel containing positive electrode material, wherein the core has a porosity of 50-90%, the shell has a porosity of 10-50%, and the ratio of the porosity of the core to that of the shell is greater than 1.2, and wherein the positive electrode material has the average composition of: $Li_{0.6+\delta}[(Ni_{x1}Co_{y1}M_{1-x1-y1}D_{\eta 1})_z \cdot (Ni_{x2}Co_{y2}M_{1-x2-y2}G_{\eta 2})_{1-z}]O_2$, $0 \le \delta \le 0.6$, $0.6 \le x1 \le 1$, $0.6 \le x2 \le 1$, $0 \le y1 \le 0.4$, $0 \le y2 \le 0.4$, $0 \le z \le 1$, $0 \le \eta 1 \le 0.1$, $0 \le \eta 2 \le 0.1$, where M is one or two of Mn and Al, D is one or more of Mo, Ti, Y, W, Ta, Nb, Cr, Sm, Sb, V, La, Ca, Hf and Zr, and G is one or more of Mo, Ta, Zn, Ti, Y, Zr, W, Nb, Cr, Sm, Al, V, La, Ca, Sb, Hf, Mg and B.

2. The positive electrode material of claim 1, wherein the core comprises macropores with a pore size of 50-500 nm, with a porosity of 60-80% for the macropores in the core; and the shell comprises macropores with a pore size of 50-500 nm, with a porosity of 20-40% for the macropores in the shell.

3. The positive electrode material of claim 1, wherein the pore volume of the positive electrode material increases as the pressure applied to the positive electrode material increases;

wherein the pore volume under pressure of the pores with a pore size of 50-110 nm in the positive electrode material is recorded as PVi, where i=0, 1, 2, 3 and 4, respectively corresponding to the pore volume of the pores when subjected to 0 tons, 1.5 tons, 2.5 tons, 3.5 tons and 4.5 tons of pressure applied to the positive electrode material, and wherein the pore volume under pressure satisfies the following formula: $1<PV_1/PV_0<1.5$, $1<PV_2/PV_0<4.0$, $1<PV_3/PV_0<6.0$ and $1<PV_4/PV_0<8$.

4. The positive electrode material of claim 1, wherein the concentration of D gradually decreases radially from the center of the core to the surface of the core, and the concentration of G gradually increases radially from the surface of the core to the surface of the shell.

5. A method for preparing the positive electrode material for lithium-ion batteries of claim 1, wherein the positive electrode material is in a form of secondary particles having a core and shell, wherein the positive electrode material is a doped nickel containing positive electrode material, and the method is characterized by comprising the steps of:

(1) subjecting a solution of soluble salts containing Ni, Co and M and a dispersion containing D to a first co-precipitation, to form the core of the secondary particles;

(2) subjecting a solution of soluble salts containing Ni, Co and M and a dispersion containing G to a second co-precipitation in the presence of the core in step (1), to form the shell on the core, to obtain the secondary particles having the core and the shell;

wherein the first co-precipitation is operated at a pH lower than that for the second co-precipitation, and a temperature lower than that for the second co-precipitation, and wherein the core has a porosity greater than that of the shell, wherein the core has a porosity of 50-90%, the shell has a porosity of 10-50%, and the ratio of the porosity of the core to that of the shell is greater than 1.2; and (3) converting the secondary particles obtained in step (2) into the positive electrode material by:

contacting the secondary particles obtained in step (2) with a lithium source material at 300-900° C. to obtain the positive electrode material, wherein the lithium source material is one or more of $Li_2O$, LiOH, $LiOH·H_2O$, $LiNO_3$ and $Li_2CO_3$, wherein M is one or two of Mn and Al, D is one or more of Mo, Ti, Y, W, Ta, Nb, Cr, Sm, Sb, V, La, Ca, Hf and Zr, and G is one or more of Mo, Ta, Zn, Ti, Y, Zr, W, Nb, Cr, Sm, Al, V, La, Ca, Sb, Hf, Mg and B.

6. The method of claim 5, wherein the concentration or flow rate of the dispersion of D is controlled in step (1), so as to make the concentration of D gradually decrease radially from the center of the core to the surface of the core, and the concentration or flow rate of the dispersion of G is controlled in step (2), so as to make the concentration of G gradually increase radially from the surface of the core to the surface of the shell.

7. The method of claim 5, wherein the step (1) comprises: operating the first co-precipitation in the presence of a complexing agent; and the step (2) comprises: operating the second co-precipitation in the presence of a complexing agent.

8. The method of claim 5, wherein the step (1) comprises: operating the first co-precipitation in the presence of 5-12 mol/L of a complexing agent; and the step (2) comprises: operating the second co-precipitation in the presence of 0.1-5 mol/L of a complexing agent, wherein the complexing agent is one or more selected from the group consisting of ammonia, ammonium sulfate, ammonium chloride and ammonium nitrate.

* * * * *